(12) United States Patent
Yun et al.

(10) Patent No.: US 8,936,041 B2
(45) Date of Patent: Jan. 20, 2015

(54) LATCH VALVE AND FLOW CONTROL DEVICE USING THE SAME

(75) Inventors: Young-Sang Yun, Seoul (KR); Man-Uk Park, Seoul (KR); Sun-Dug Kwon, Seoul (KR); Sung-Worl Jin, Seoul (KR); Ji-Hye Jeong, Seoul (KR)

(73) Assignee: Woongjin Coway Co., Ltd (KR)

( * ) Notice: Subject to any disclaimer, the term of this patent is extended or adjusted under 35 U.S.C. 154(b) by 74 days.

(21) Appl. No.: 13/639,748

(22) PCT Filed: Sep. 29, 2010

(86) PCT No.: PCT/KR2010/006631
§ 371 (c)(1),
(2), (4) Date: Oct. 5, 2012

(87) PCT Pub. No.: WO2011/129498
PCT Pub. Date: Oct. 20, 2011

(65) Prior Publication Data
US 2013/0025721 A1    Jan. 31, 2013

(30) Foreign Application Priority Data

Apr. 15, 2010    (KR) .......................... 10-2010-0034927

(51) Int. Cl.
*E03B 1/00* (2006.01)
*G05D 16/06* (2006.01)
*F16K 3/24* (2006.01)
*F16K 31/12* (2006.01)
*F16K 31/40* (2006.01)
*F16K 31/08* (2006.01)

(52) U.S. Cl.
CPC ............. *F16K 31/404* (2013.01); *F16K 31/082* (2013.01)

USPC .............................. 137/613; 137/628; 251/38

(58) Field of Classification Search
USPC .......... 137/613, 614.11, 628, 625.28, 599.01, 137/601.14, 863; 251/111, 29, 33, 36, 38
See application file for complete search history.

(56) References Cited

U.S. PATENT DOCUMENTS 2,362,631 A * 11/1944 Harris .............................. 137/80
4,450,863 A *  5/1984 Brown .......................... 137/613

(Continued)

FOREIGN PATENT DOCUMENTS

CN         1493021        4/2004
CN       101413596        4/2009

(Continued)

OTHER PUBLICATIONS

PCT/ISA/210 Search Report issued on PCT/KR2010/006631 (pp. 3), Dated May 24, 2011.

(Continued)

*Primary Examiner* — John K Fristoe, Jr.
*Assistant Examiner* — Michael R Reid
(74) *Attorney, Agent, or Firm* — The Farrell Law Firm, P.C.

(57) ABSTRACT

There are provided a latch valve consuming less power, having a simpler structure, and guaranteeing reliable valve operation, there is provided a flow control device comprising a plurality of latch valves connected in series, and the second to the last latch valves, among the latch valves connected in series, include an additional outflow path constantly communicating with a space part between a support body and a plunger, respectively, to allow water from an inlet to constantly flow out to the additional outflow paths.

7 Claims, 7 Drawing Sheets

(56) References Cited

U.S. PATENT DOCUMENTS

| | | | | |
|---|---|---|---|---|
| 4,502,661 | A | * | 3/1985 | Swanson .................. 251/30.04 |
| 5,299,775 | A | * | 4/1994 | Kolze ...................... 251/30.03 |
| 5,915,665 | A | | 6/1999 | Paese et al. |
| 6,047,718 | A | * | 4/2000 | Konsky et al. ................. 137/1 |
| 6,457,696 | B1 | * | 10/2002 | Hirota ..................... 251/30.02 |
| 2004/0011411 | A1 | * | 1/2004 | Thordarson et al. ......... 137/613 |
| 2005/0045480 | A1 | | 3/2005 | Krumme |
| 2007/0237686 | A1 | | 10/2007 | Mathies et al. |
| 2008/0029393 | A1 | | 2/2008 | Krumme |

FOREIGN PATENT DOCUMENTS

| | | |
|---|---|---|
| CN | 101449089 | 6/2009 |
| CN | 201265692 | 7/2009 |
| JP | 2007-504402 | 3/2007 |
| WO | WO 02/31611 | 4/2002 |

OTHER PUBLICATIONS

PCT/ISA/237 Written Opinion issued on PCT/KR2010/006631 (pp. 3), Dated May 24, 2011.

* cited by examiner

LATCH VALVE AND FLOW CONTROL DEVICE USING THE SAME

TECHNICAL FIELD

The present invention relates to a structure of a latch valve capable of controlling a flow rate and a flow control device using the latch valve, and more particularly, to a latch valve for minimizing power consumption and a flow control device using the same.

BACKGROUND ART

In general, a flow control device uses a stepping motor or a plurality of solenoid valves to control a flow rate. For example, power is supplied, so the solenoid valves or the stepping motor is operated by using the supplied power to control a flow rate.

The related art bidet controls a flow rate by using a solenoid valve as shown in FIG. 1. In the solenoid valve 1, a plunger 22 is usually in contact with a support body 21 of a diaphragm 20 by virtue of an elastic force of a spring 5 to block an outlet path 15, and when electricity is applied to a solenoid SL, the plunger 22 is lifted up by a magnetic force generated from the solenoid SL, allowing water introduced from an inflow path 10 to flow out to the outflow path 15 through a space part 30.

In the solenoid valve 1, the plunger 30 blocks the outlet path 15 when no electricity is supplied to the solenoid SL, so electrically is constantly supplied in an open state.

In general, in an area in which electricity is applied, a flow rate can be controlled by using the solenoid valve 1. Meanwhile, in an area in which electricity is not supplied, or in order to reduce the use of electricity, power is generated by using water introduced into a self-generation bidet and the bidet is controlled by using generated power. In this case, however, the amount of electricity generated by the introduced water is too small to operate the solenoid valve 1.

A latch valve 2 adaptive to use less power is illustrated in FIG. 2. In the latch valve 2, a magnetic force induced by supplying electricity to a coil of a solenoid SL lifts the plunger 22 up, against the elastic force of the spring 5, and in this case, the plunger 22 can be maintained in an open position by virtue of the magnetic force of a permanent magnet (M), although electricity is not supplied to the solenoid SL. Thus, simply supplying power to open or close the latch valve will do, compared with the solenoid valve 1.

However, in the case of the latch valve which needs power only when it is opened or closed, when the valve is closed, the diaphragm 20 wobbles so as to hit the plunger 22.

In the case of the solenoid valve 1, although the diaphragm 20 wobbles to hit the plunger 22, when the solenoid valve becomes balanced, the solenoid valve is closed, owing to the elastic force of the spring 5 and the self-weight of the plunger 22, but in the case of the latch valve 2, when the plunger 22 is excessively pushed up, the plunger 22 is attached to the permanent magnet, maintaining an open state.

In particular, it may be difficult for the self-generation bidet to continuously or repeatedly use electricity, so the valve is required to be more reliably operated.

DISCLOSURE OF INVENTION

Technical Problem

An aspect of the present invention provides a latch valve consuming less power, having a simpler structure, and guaranteeing reliable valve operation, and a flow control device using the same.

Solution to Problem

According to an aspect of the present invention, there is provided a flow control device comprising a plurality of latch valves connected in series, and the second to the last latch valves, among the latch valves connected in series, include an additional outflow path constantly communicating with a space part between a support body and a plunger, respectively, to allow water from an inlet to constantly flow out to the additional outflow paths.

The latch valve may comprise an inflow path and an outflow path formed in a housing; a solenoid having a coil wound thereon; a permanent magnet positioned at an upper portion of a plunger and latching the plunger when the plunger is lifted; a spring positioned between the permanent magnet and the plunger; a support body having an inlet connected to the inflow path and an outlet connected to the outflow path; a diaphragm having the support body inserted therein; and the plunger lifted or lowered by a magnetic force induced by the coil to open and close the outlet.

The plurality of latch valves may be first and second latch valves, and an outflow path, along which water passes after having passed through the outlet of the first latch valve may be connected to an inflow path supplying water to the inlet of the second latch valve.

According to another aspect of the present invention, there is provided a latch valve including: an inflow path and an outflow path formed in a housing; a solenoid having a coil wound thereon; a permanent magnet positioned at an upper portion of a plunger and latching the plunger when the plunger is lifted; a spring positioned between the permanent magnet and the plunger; a support body having an inlet connected to the inflow path and an outlet connected to the outflow path; a diaphragm having the support body inserted therein; and a plurality of latch valves each having the plunger lifted or lowered by a magnetic force induced by the coil to open and close the outlet, wherein an additional outflow path constantly communicating with a space part between the support body and the plunger is provided to allow a flow to be generated in the additional outflow path even when the plunger is closed.

In the latch valve or the flow control device, the additional outflow path of the second latch valve may be formed in the housing surrounding the plunger.

A stopper may be formed in the space part of the latch valve in order to prevent the support body from lifting by more than a certain degree.

The stopper may be formed on an upper surface of the support body and may be formed of an elastic member.

Advantageous Effects of Invention

The latch valve capable of controlling a flow rate with a simpler structure at a low rate of power consumption, and the flow control device can be provided.

In addition, the latch valve can be operated without causing an error and consume minimum power, and the flow control device can be provided.

BEST MODE FOR CARRYING OUT THE INVENTION

Hereinafter, a latch valve and a flow control device using the latch valve will now be described with reference to the accompanying drawings.

Figure 1:
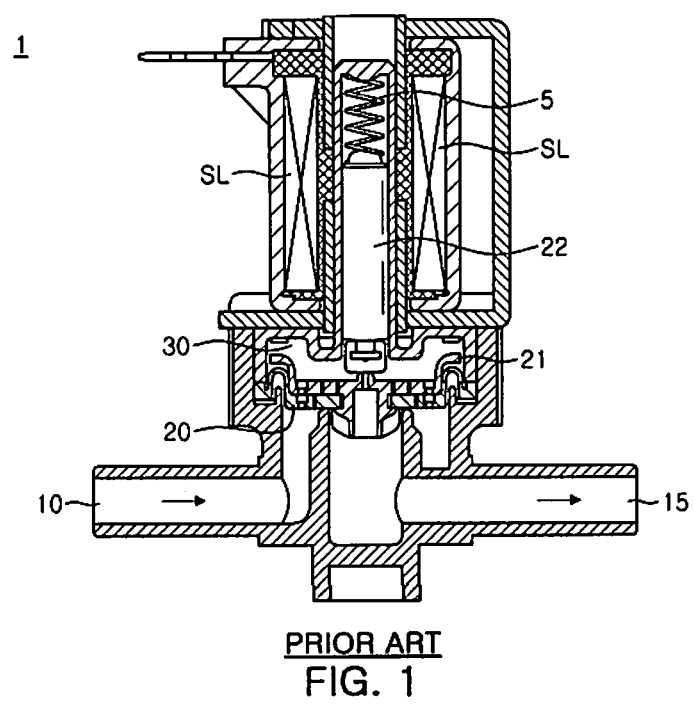
FIG. 1 is a sectional view of the related art solenoid valve.
Figure 2:
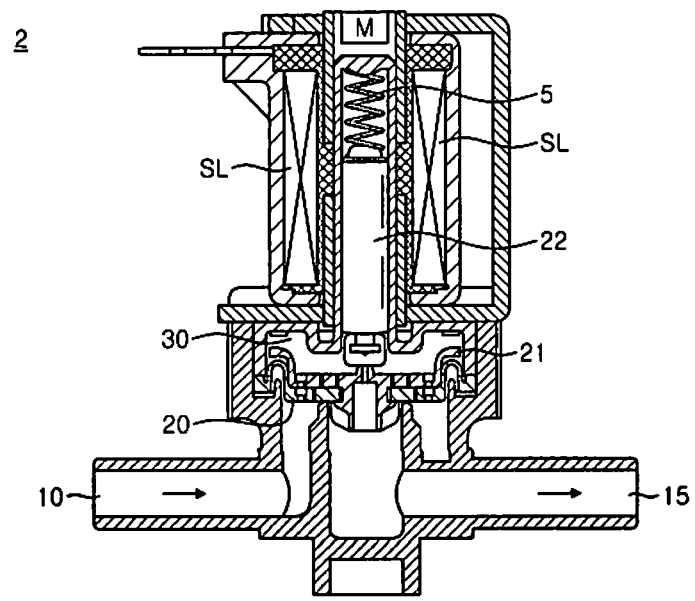
FIG. 2 is a sectional view of the related art latch valve.
Figure 3:
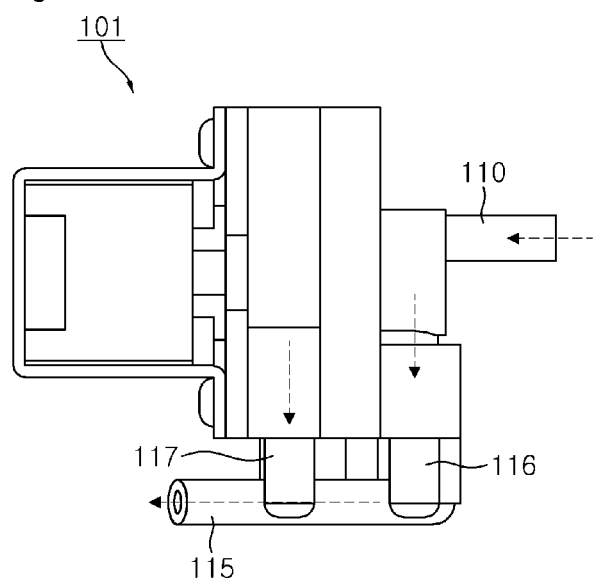
FIG. 3 is a plan view of a latch valve according to an exemplary embodiment of the present invention.

FIG. 3 is a plan view of a latch valve according to an exemplary embodiment of the present invention. A latch valve 101 includes a single inflow path 110, two outflow paths 116 and 117, and an outlet path 115 in which the two outflow paths 116 and 117 meet.

Figure 4:
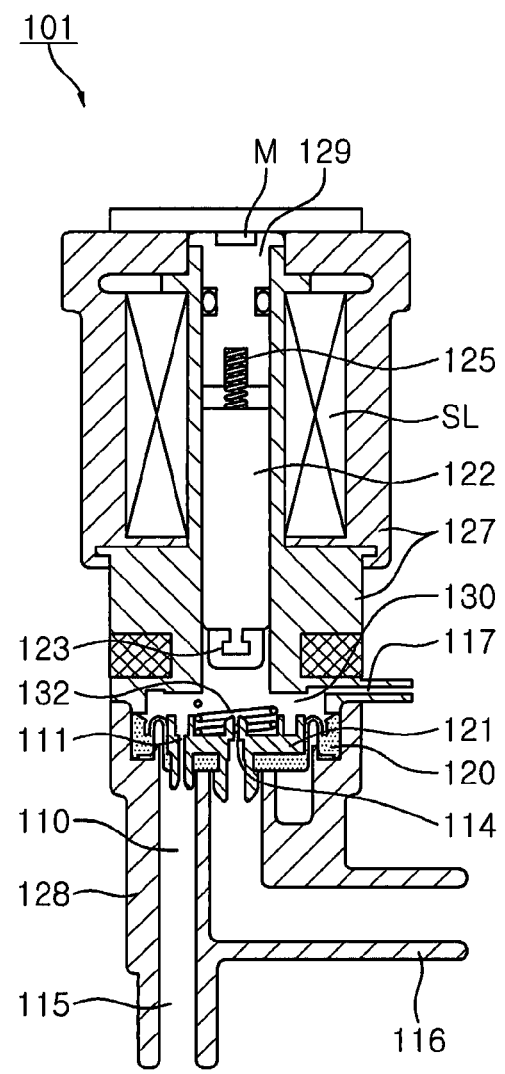
FIG. 4 is a sectional view of the latch valve according to an exemplary embodiment of the present invention.

FIG. 4 is a sectional view of the latch valve according to an exemplary embodiment of the present invention. As shown in FIG. 4, a coil is wound on a solenoid SL at an inner side of a housing 127 in the latch valve 101. A plunger 122 and an iron core 129 are disposed at an inner side of the solenoid SL. A permanent magnet M is disposed at an upper portion of the iron core 129. A spring 125 is disposed in the iron core 129, and in this case, the spring 125 is disposed to push the plunger 122 toward an outlet 114.

A lower housing 128 includes an inflow path 110 and a first outflow path 116. A diaphragm 120 made of a rubber material having elasticity and a support body 121 made of a plastic material, inserted into the diaphragm 120, and having an inlet 111 and the outlet 114 are provided at end portions of the inflow path 110 and the first outflow path 116. The inflow path 110 communicates with a space part 130 through the inlet 111, and the first outflow path 116 communicates with the space part 130 through the outlet 114.

A second outflow path 117, an additional outflow path, is formed in the space part 130 between the diaphragm 120 and the support body 121 and the upper housing 127. A spring as a stopper 132 is mounted on an upper surface of the support body 121. The stopper 132 may have a radius larger than that of the plunger 122, so the stopper 132 preferentially meets the upper housing 127 to prevent the support body 121 and the diaphragm 120 from lifting.

In the latch valve 101, when a sealing part 123 of the plunger 122 blocks the outlet 114 of the support body 121, the plunger 122 of the latch valve 101 is in a closed position, and when the sealing part 123 of the plunger 122 opens the outlet 114 of the support body 121, the plunger 122 of the latch valve 101 is in an open position.

Even when the plunger 122 of the latch valve 101 is in the closed position at which the outlet 114 is blocked, the inlet 110 and the space part 130 communicate and the space part 130 and the second outflow path 117 communicate, so water introduced from the inlet 110 can flow out through the second outflow path 117 formed at the space part 130.

As illustrated in FIG. 4, when the plunger 122 is in the open position in which the outlet 114 is open, water introduced through the inlet 111 may be discharged to the second outflow path 117 communicating with the space part 130, as well as to the first outflow path 116 through the outlet 114, and water which has been discharged to the first outflow path 116 and water which has been discharged to the second outflow path 117 meet the outlet path 115 so as to be provided to a nozzle of a bidet.

Thus, compared with the case in which the plunger 122 is in the closed position, when the plunger 122 is in the open position, an additional amount of water, namely, as large as the amount of water which flows in the first outflow path 116, can flows, and the flow rate of water passing through the latch valve 101 can be controlled by moving the plunger 122 into the open position and the closed position.

Also, as described above, in the related art latch valve, the diaphragm made of a rubber material is deformed by a turbulent flow generated when the plunger is moved to the closed position. In particular, because both ends of the diaphragm are fixed to the housing, the central portion of the diaphragm rises in a convex shape, and the convex, the rising diaphragm and the support body arrest the descending plunger, forcing the plunger not to descend to the closed position, but to be maintained in the open position in which the plunger clings to the permanent magnet.

In comparison, however, as shown in FIG. 4, in an exemplary embodiment of the present invention, because the support body 121 includes the stopper 132, before the diaphragm 120 and the support body 121 hit the plunger 122, the stopper 132 of the support body 121 meets the upper housing 127, so the plunger 122 can be prevented from lifting due to the deformation of the diaphragm 120. Also, because the stopper 132 is formed as a spring, an elastic member, it can store force from the ascending diaphragm 120 and the support 121 and apply it downwardly to help mount the diaphragm 120 and the support 121 on the lower housing 128.

Figure 5:
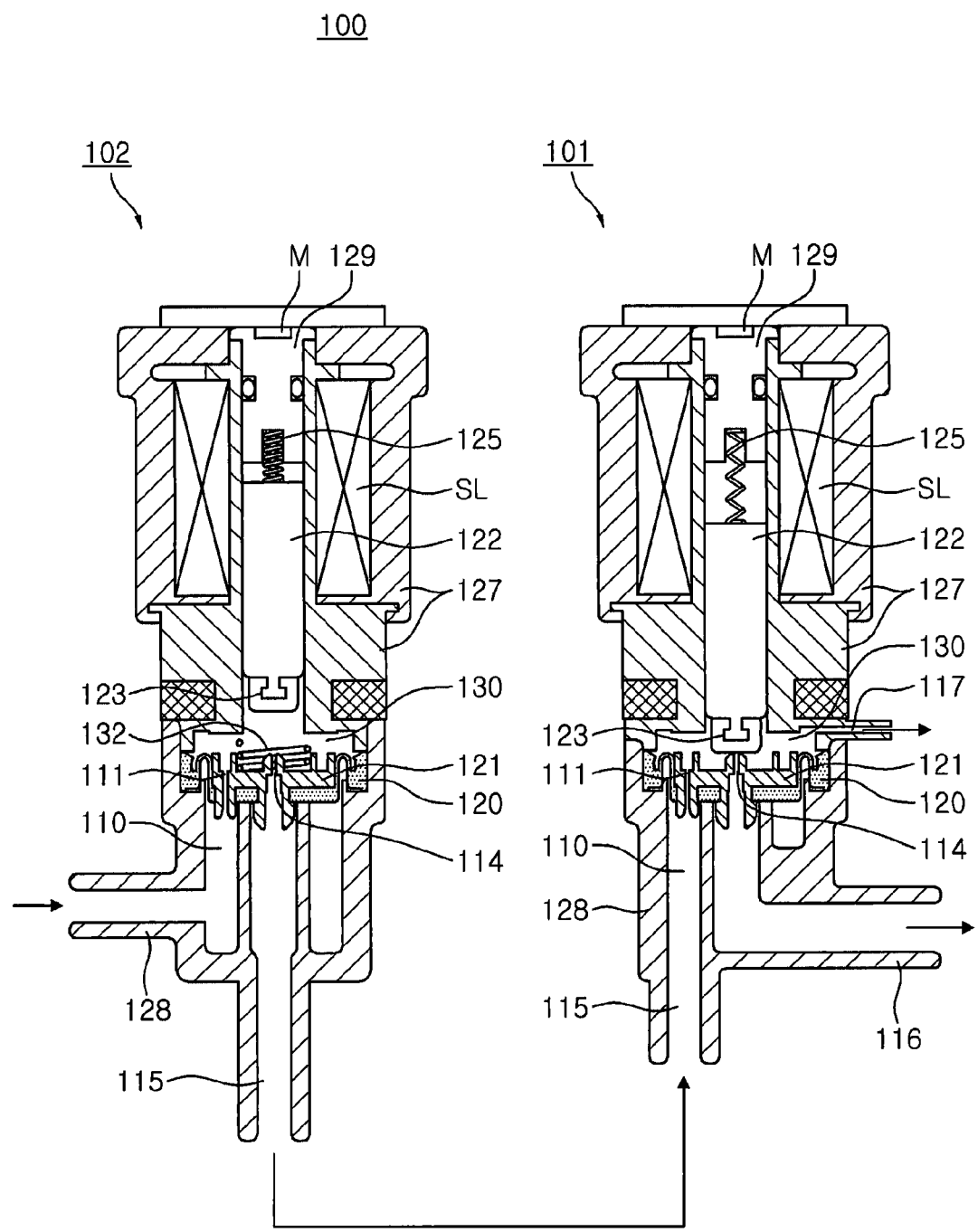
FIG. 5 is a sectional view of a flow control device according to an exemplary embodiment of the present invention.

FIG. 5 is a sectional view of a flow control device 100 using a latch valve according to an exemplary embodiment of the present invention. The latch valve 101 has the same configuration as that illustrated in FIG. 4, except that the stopper 132 is not formed therein, and a latch valve 102 has the same configuration as that of the related art latch valve, except that the stopper 132 is formed therein.

An outflow path 115 of the latch valve 102 is connected to an inflow path 110 of the latch valve 101, so that only when the latch valve 102 is open, water is supplied to the inflow path 110 of the latch valve 101.

In the flow control device according an exemplary embodiment of the present invention, the latch valves 101 and 102 are disposed in series, so that when the front latch valve 102 is closed, there is no flow that passes through the flow control device regardless of whether or not the latch valve 101 connected to the latch valve 102 is open or closed. Also, when the latch valve 102 is open and the latch valve 101 is closed, because the latch valve 101 includes the second outflow path 117 communicating with the space part 130, a certain flow can be obtained through the second outflow path 117 of the latch valve 101, and when both the latch valves 101 and 102 are all open, because a flow can be obtained even by the first outflow path 116 as well as the second outflow path 117, resulting in that a larger amount of flow can be obtained compared with the case in which the latch valve 102 is open and the latch valve 101 is closed.

The flow control device using the two latch valves 101 and 102 requires less power than controlling a flow by using a plurality of solenoid valves or stepping motors of the related art, so it can be used for a self-generation bidet that does not have external power.

Also, no flow can be formed by simply moving one latch valve to the closed position. That is no flow can be formed by less power compared with the case in which the latch valves are disposed in parallel. The self-generation bidet without having an external power source cannot secure power on a regular basis, so when an amount of power is small, the bidet requires an additional power securing means. However, in the case in which the latch valves are connected in series, one latch valve can be operated, and then, when power is secured, another latch valve may be returned to its original state.

In FIG. 5, the stopper 132 is mounted in the latch valve 102, but not in the latch valve 101. The front latch valve 102 serves to determine the presence or absence of a flow, so if malfunction of the latch valve 102 is prevented, a problem in which water continuously flows within the entirety of the flow control device 100 can be solved. Also, when the front latch valve 102 is in the closed state, there is no water introduced through the inflow path 110 of the rear latch valve 101. Thus, compared with the front latch valve 102, the problem that the diaphragm 120 hits the plunger 122 is insignificant. In the present exemplary embodiment, the stopper 132 is not disposed in the latch valve 101, but the stopper 132 may be mounted in both latch valves 101 and 102.

The position of the second outflow path 117 of the latch valve according to an exemplary embodiment of the present invention will now be described.

Figure 6:
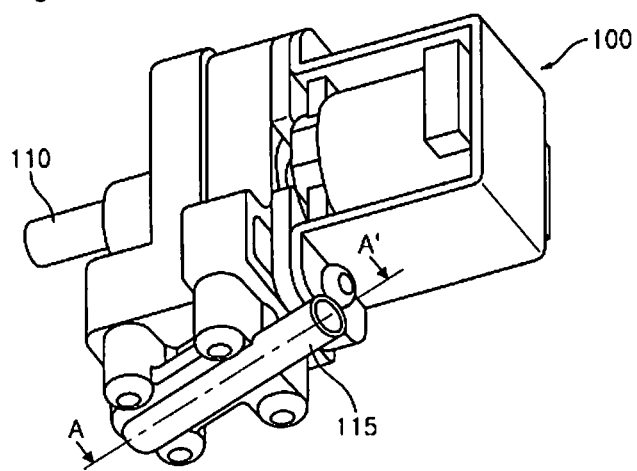
FIG. 6 is a perspective view of the latch valve according to an exemplary embodiment of the present invention.
Figure 7:
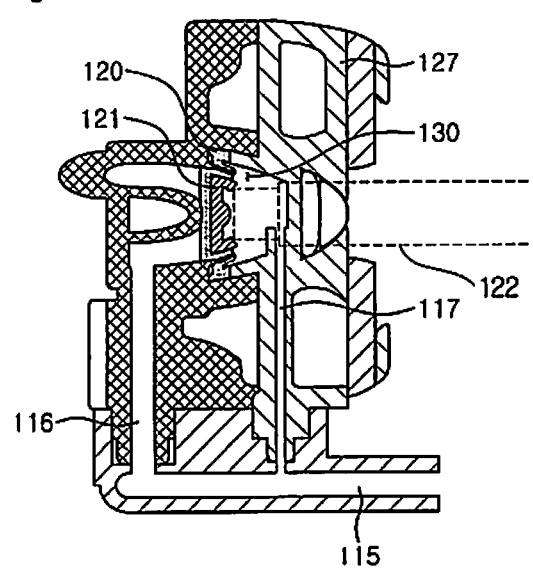
FIG. 7 is a partial sectional view of the latch valve taken along line A-A in FIG. 6.

In FIGS. 4 and 5, the second outflow path 117 is formed in the housing 127 at an outer side of the space part 130, and in FIGS. 6 and 7, the second outflow path 117 is formed at a portion surrounding the plunger 122 on the housing 127. When viewed from an upper surface of the latch valve 102, the second outflow path 117 is formed at a different position from the first outflow path 116.

As shown in FIG. 7, a sectional view taken along line A-A' of FIG. 6, the second outflow path 117 is formed on the housing 127 surrounding the plunger 122, specifically, on the housing 127 near the plunger 122 when the plunger 122 is in the closed position.

Thus, because the second outflow path 117 is disposed on the housing 127 surrounding the plunger 122, the second outflow path 117 can indirectly communicate with the space part 130, and thus, it can be less affected by a turbulent current generated in the space part 130 and has a simpler structure.

The exemplary embodiments of the latch valve and the flow control device using the latch valve have been described, but the present invention is not limited thereto and various modifications can be obviously made.

In the above-described exemplary embodiments, the stopper 130 is mounted as an elastic member on the support body 121. However, the stopper 130 may be formed on the housing 127, and although the stopper 130 is made of a material, namely, a non-elastic member, rather than an elastic member, it can prevent the diaphragm 120 and the support body 121 from lifting.

Also, the method of controlling a flow by using two latch valves have been described, but three or more latch valves may be used to control a flow so long as the latch valves include the second outflow path.

In addition, the flow control device using the latch valve has been described to be used for a self-generation bidet, but the flow control device according to an exemplary embodiment may be also used for a general bidet, rather than the self-generation bidet, or any other flow control device.

The invention claimed is:

1. A flow control device comprising:
first and second latch valves connected in series,
wherein each of the first and second latch valves comprises an inflow path and an outflow path formed in a housing, a solenoid having a coil wound thereon, a support body having an inlet connected to the inflow path and an outlet connected to the outflow path, a diaphragm having the support body inserted therein, and a plunger lifted or lowered by a magnetic force induced by the coil to open and close the outlet, and
wherein the second latch valve includes an additional outflow path constantly communicating with a space part between the support body and the plunger, to allow water from the inlet of the second latch valve to constantly flow out to the additional outflow path.

2. The device of claim 1, wherein each of the first and second latch valves further comprises:
a permanent magnet positioned at an upper portion of the plunger and latching the plunger when the plunger is lifted; and
a spring positioned between the permanent magnet and the plunger.

3. The device of claim 1, wherein the outflow path, along which water passes after having passed through the outlet of the first latch valve is connected to the inflow path supplying water to the inlet of the second latch valve.

4. The device of claim 3, wherein the additional outflow path of the second latch valve is formed in the housing surrounding the plunger.

5. The device of claim 3, wherein a stopper for preventing the support body from lifting by more than a certain degree is formed on the first latch valve, the second latch valve, or in a space part of the first and second latch valves.

6. The device of claim 5, wherein the stopper is provided on an upper surface of the support body.

7. The device of claim 5, wherein the stopper is formed of an elastic member.

\* \* \* \* \*